UNITED STATES PATENT OFFICE 2,532,311

GAS PHASE HYDROGENATION OF DIHYDROMUCONONITRILE TO ADIPONITRILE

Benjamin W. Howk and Mark W. Farlow, Wilmington, Del., assignors to E. I. du Pont de Nemours & Company, Wilmington, Del., a corporation of Delaware No Drawing. Application July 7, 1948, Serial No. 37,510

8 Claims. (Cl. 260—465.8)

This invention relates to a catalytic process for the preparation of adiponitrile.

It is known that adiponitrile may be prepared by the catalytic dehydration of adipic acid-ammonia mixtures over dehydration catalysts. Although this process is very satisfactory, with the expanding demand for both adiponitrile and adipic acid it has become increasingly important that alternative routes to adiponitrile be developed which are independent of adipic acid.

It is therefore an object of this invention to prepare adiponitrile from a raw material other than adipic acid. It is a further object of this invention to provide a simple method for preparing adiponitrile by selective hydrogenation of 1,4-dicyanobutenes which in turn are readily obtainable from butadiene. Another object of the invention is to prepare adiponitrile in good yields by selective hydrogenation of either 1,4-dicyano-2-butene or 1,4-dicyano-1-butene. Other objects of the invention will appear hereinafter.

According to this invention adiponitrile is prepared by the gas-phase hydrogenation of a 1,4-dicyanobutene at a pressure of from 0.5 to 5.0 atmospheres and at temperatures in the range of 200° to 350° C. over a palladium catalyst.

According to a preferred embodiment of the invention, a gaseous mixture of dicyanobutene and hydrogen is continuously passed at essentially atmospheric pressure over a palladium catalyst heated to between 200° and 350° C.

Generally liquid or molten dicyanobutene and gaseous hydrogen are passed into a chamber which is heated to a temperature near that selected for effecting the reaction, and the resultant heated gas mixture is passed into a chamber containing the catalyst heated to the selected reaction temperature, where the exothermic hydrogenation reaction occurs. The reaction product is cooled, the condensed adiponitrile is separated, and the unreacted hydrogen, if desired, is recycled into the reaction system.

The process of this invention is, in general, operated at pressures which are essentially atmospheric and at temperatures which are in the range of 200° to 350° C. Since satisfactory reaction rates are obtained at temperatures of from 250° to 300 C., this range is regarded as the most useful. If desired, pressures somewhat above atmospheric pressure, i. e., up to 5 atmospheres, can be used. For optimum results, it is important that the temperature and pressure be so controlled as to completely avoid the presence of a liquid film, i. e. the reaction should preferably occur entirely in the gas phase.

Theoretically one mole of hydrogen per mole of dicyanobutene is required. In actual practice, however, larger amounts are employed to aid in the vaporization of the dicyanobutene, to insure complete hydrogenation, and to remove the exothermic heat of reaction. Excellent results are obtained when employing from 10 to 100 moles of hydrogen per mole of dicyanobutene.

Any palladium catalyst may be employed in the practice of this invention. Thus, there may be used palladium or any of its compounds such as the oxide, chloride, nitrate, etc., and they may be unsupported or supported on inert base materials. Compounds of palladium appear to be more or less completely reduced to palladium metal during operation. Suitable supports are charcoal, alumina, calcium carbonate, pumice, silica, and the like. The particle size of the support may vary from 40 to 300 mesh for use in fluidized systems whereas for use in a fixed bed system supports of larger particle size, for example, of 4 to 40 mesh are satisfactory. A suitable palladium catalyst is prepared by depositing palladium chloride on granular activated coconut charcoal, in amount sufficient to give a concentration of 0.2 to 20 grams of palladium per liter of catalyst. Preferably, the charcoal is subjected to pretreatment with an acid such as nitric acid prior to contacting it with the palladium compound.

A suitable amount of catalyst is such as to provide at least 0.00001 gram of palladium per gram of dicyanobutene being processed per hour. Ordinarily larger amounts are used since the advantages accruing from the standpoint of speed of reaction offset the added catalyst cost. Prereduction of the catalyst is an important factor in obtaining good catalyst activity. This may be achieved, for instance, by passing hydrogen over it at about 200° to 300° C. Formaldehyde and other reducing agents may be employed in place of the hydrogen.

The dicyanobutenes used in the practice of this invention are 1,4-dicyano-1-butene and 1,4-dicyano-2-butene. The 1,4-dicyano-2-butene, which is a solid at room temperature, may be obtained, for instance, by cyanation of the dichlorobutenes resulting from the chlorination of butadiene-1,3. Methods for carrying out this cyanation are disclosed by G. M. Whitman in S. N. 768,283, filed August 12, 1947, now U. S. 2,477,674; by J. R. Johnson and G. M. Whitman in S. N. 768,284, filed August 12, 1947, now U. S. 2,477,617, and by I. D. Webb and G. E. Tabet in S. N. 745,236, filed May 1, 1947, now U. S. 2,477,672.

The 1,4-dicyano-1-butene may be obtained, for instance, by isomerizing 1,4-dicyano-2-butene according to the method proposed by G. F. Hager in S. N. 756,097, filed June 20, 1947, now U. S. 2,451,386.

If desired, the process of this invention may be carried out in the presence of an inert solvent, such as an ether, alcohol, hydrocarbon, etc. The use of such solvents adds to the cost without compensating practical advantages, and the process is therefore preferably operated in the absence of solvents or diluents.

Technically the present process represents a marked advance since it makes possible the preparation of adiponitrile by the selective hydrogenation of the carbon-to-carbon unsaturation in dicyanobutenes obtainable from butadiene. The process is simple and direct, and the adiponitrile is obtained in essentially quantitative yield free of contaminating impurities or side reaction products. The adiponitrile may be further hydrogenated to hexamethylenediamine or it may be hydrolyzed to adipic acid, thus providing an alternative new source for these polyamide intermediates.

The examples which follow are submitted to illustrate and not to limit this invention.

*Example 1.*—A catalyst is prepared by dissolving an amount of palladium chloride equivalent to 0.050 g. of palladium in 50 ml. of water and adding nitric acid dropwise until the solution becomes clear. The palladium chloride solution is poured with stirring over 50 ml. of nitric acid-washed, 8 to 14 mesh charcoal and the mixture is evaporated to dryness on a steam bath. An apparatus for gas-phase hydrogenation of dicyanobutene consists of a Pyrex U-tube, 22 mm. O. D., immersed to a depth of 10 inches in a bath of boiling Dowtherm, B. P. 260° C. Hydrogen and molten 1,4-dicyano-2-butene are fed downward into one leg of the U-tube, which is packed with glass helices. Here the dicyanobutene is vaporized and mixed and mixed with the gaseous hydrogen. The other leg of the U-tube contains the palladium catalyst. The product is taken off above the catalyst through a water-cooled condenser, the resulting adiponitrile is collected, and the excess hydrogen metered.

With a dicyanobutene rate of 17.5 g. per hour, and 120 liters/hr. of excess hydrogen, there is collected over a 4-hour period, 71.5 g. of adiponitrile, refractive index, $n_D^{25}=1.4363$. The product has a melting point of 3.0 to 3.5° C. and on distillation the entire amount boils at 115° to 120° C. at 1 mm. of mercury pressure.

*Example 2.*—A catalyst is prepared similar to that used in Example 1 except that the charcoal, prior to nitric acid washing, is heated in a stream of hydrogen at 450° C. for seven hours; and palladium nitrate is deposited on the charcoal to produce a palladium concentration of 0.1 g./liter of catalyst. With the apparatus of Example 1, 50 cc. of catalyst, and flow rates of 72 g./hr. of 1,4-dicyano-2-butene and 480 liters/hr. of hydrogen, there is obtained during one hour of operation 71.9 g. of product having a refractive index, $n_D^{25}=1.4372$. The product contains approximately 95% of adiponitrile and 5% of 1,4-dicyano-1-butene.

*Example 3.*—A catalyst is prepared by diluting 1 ml. of commercial 5% palladium chloride solution, equivalent to 0.030 g. of palladium, with 30 ml. of water. The palladium chloride solution is poured with stirring over 50 ml. of nitric acid-washed, 8 to 14 mesh tabular alumina, the mixture is evaporated to dryness on a steam bath, and the catalyst is charged into the apparatus described in Example 1.

With a dicyanobutene rate of 25 to 27 g. per hour, and 175 liters/hr. of excess hydrogen, there is collected after a short conditioning period, 186.5 g. of adiponitrile, $n_D^{25}=1.4361$ to 1.4368, during seven hours. This quantity of product corresponds to a 98.8% conversion.

With a dicyanobutene rate of 52 to 53 g. per hour, and 170 liters/hr. of excess hydrogen, there is collected over a 1.75 hour period 93.4 g. of adiponitrile, $n_D^{25}=1.4361$ to 1.4365. This quantity of product corresponds to a 99.6% conversion.

*Example 4.*—A mixture of approximately equal parts of the cis and trans isomers of 1,4-dicyano-1-butene is hydrogenated at a rate of approximately 31 g./hr. in the apparatus described in Example 1, using 50 ml. of the catalyst described in Example 3 and a hydrogen flow of 480 liters/hr. The first portion of the product contains ammonia and amino compounds and has a refractive index, $n_D^{25}$, of approximately 1.4400. The refractive index drops and soon becomes constant at approximately 1.4360 and there is produced a theoretical yield of adiponitrile, M. P. about 1° C.

*Example 5.*—A catalyst is prepared by diluting 9.75 g. of commercial 5% palladium nitrate solution, equivalent to 0.225 g. palladium, with 80 ml. of water. The palladium nitrate solution is added to a vigorously agitated suspension of 75 ml. nitric acid-washed, 50-to-100 mesh charcoal in 80 ml. water. After all of the palladium solution has been added, the system is heated to 100° C., allowed to cool to room temperature, and then filtered. The impregnated charcoal is dried at 100° C. and charged into the catalyst chamber of a reactor unit similar to that described in Example 1.

During operation the finely divided catalyst, which may vary in particle size from 40 to 300 mesh depending on the specific equipment employed, assumes the characteristics of a fluid and exhibits a vigorous boiling action due to the passage of the hydrogen and reactant and product vapors. The extent of fluidization can be controlled by varying the catalyst particle size or the gas velocity so as to retain all of the catalyst in the apparatus or to continuously remove small portions of the catalyst with the product.

With a dicyanobutene rate of 17 g. per hour, 170 liters/hr. of excess hydrogen, and a bath temperature of 255 to 260° C., there is collected over a 1.67 hour period 28.3 g. of adiponitrile, $n_D^{25}=1.4368$. This quantity of product corresponds to a 99.3% conversion.

Since the reaction is highly exothermic, the best results are obtained when the apparatus is designed for efficient heat removal.

An important feature of the catalysts of this invention is that they may be regenerated a number of times without evidencing any decrease in activity. One method for regenerating the catalysts involves passing a stream of hydrogen over them at a temperature of from 350° to 650° C. for a period of from one hour up to 20 hours or more. Another method for regenerating the catalysts involves heating them in a mixture of nitrogen and air at a temperature of from 200° to 300° C. until the initial strongly exothermic reaction is complete.

A number of other hydrogenation catalysts, including various ruthenium, nickel, cobalt, copper and other catalysts, have been tested under conditions comparable to those reported herein, but these other catalysts have not measured up to the palladium catalysts of the invention. The other catalysts are either less active or less selective or else they exhibit a short life as the result of becoming fouled, presumably by tar or polymer formation.

Since many modifications of the process of this invention will occur to those skilled in the art, it is not intended that the invention be limited in any way other than by the following claims.

We claim:

1. A process for preparing adiponitrile which comprises contacting a vaporous mixture comprising a 1,4-dicyanobutene and at least one mole of hydrogen per mole of dicyanobutene, at a pressure of from 0.5 to 5.0 atmospheres and at a temperature of from 200° to 350° C., with a palladium catalyst.

2. A gas-phase process for preparing adiponitrile by catalytic hydrogenation of 1,4-dicyanobutene which comprises contacting a vaporous mixture of the 1,4-dicyanobutene and at least one mole of hydrogen per mole of dicyanobutene, at a pressure of from 0.5 to 5.0 atmospheres and at a temperature of from 250° to 300° C. with a palladium-on-activated charcoal catalyst.

3. A gas-phase process for preparing adiponitrile by catalytic hydrogenation of a 1,4-dicyanobutene which comprises continuously passing a vaporous mixture comprising the 1,4-dicyanobutene and at least one mole of hydrogen per mole of dicyanobutene at a pressure of from 0.5 to 5.0 atmospheres and at a temperature of from 200° to 350° C., over a palladium catalyst.

4. A gas-phase process for preparing adiponitrile by catalytic hydrogenation of a 1,4-dicyanobutene which comprises continuously passing a vaporous mixture comprising a 1,4-dicyanobutene and at least one mole of hydrogen per mole of said dicyanobutene, at substantially atmospheric pressure and at a temperature of from 250° to 300° C., over a catalyst consisting of palladium supported on activated charcoal.

5. A gas-phase process for preparing adiponitrile by catalytic hydrogenation of 1,4-dicyano-2-butene which comprises forming a vaporous mixture containing 1,4-dicyano-2-butene and from 10 to 100 moles of hydrogen per mole of 1,4-dicyano-2-butene; passing said mixture continuously, at substantially atmospheric pressure and at a temperature within the range of from 250° to 300° C., over a palladium catalyst; and thereafter separating adiponitrile from the reaction mixture.

6. A gas-phase process for preparing adiponitrile by catalytic hydrogenation of 1,4-dicyano-1-butene which comprises forming a vaporous mixture containing 1,4-dicyano-1-butene and from 10 to 100 moles of hydrogen per mole of 1,4-dicyano-1-butene; passing said mixture continuously, at substantially atmospheric pressure and at a temperature of from 250° to 300° C., over a palladium catalyst; and thereafter separating adiponitrile from the reaction mixture.

7. A gas-phase process for preparing adiponitrile by catalytic hydrogenation of 1,4-dicyano-2-butene which comprises forming a vaporous mixture containing 1,4-dicyano-2-butene and from 10 to 100 moles of hydrogen per mole of 1,4-dicyano-2-butene; passing said mixture continuously, at substantially atmospheric pressure and at a temperature within the range of from 250° to 300° C., over a catalyst containing from 0.2 to 20 grams of palladium per liter of catalyst, said catalyst having been prepared by contacting a solution of palladium chloride with nitric acid-washed granular activated coconut charcoal, followed by evaporation to dryness of the impregnated charcoal; and thereafter separating adiponitrile from the reaction mixture.

8. A gas-phase process for preparing adiponitrile by catalytic hydrogenation of a 1,4-dicyanobutene which comprises contacting a vaporous mixture comprising a 1,4-dicyanobutene and at least one mole of hydrogen per mole of dicyanobutene, at a pressure of from 0.5 to 5.0 atmospheres and at a temperature of from 200° to 350° C., with a catalyst containing from 0.2 to 2.0 grams of palladium per liter of catalyst, said catalyst having been prepared by contacting a solution of palladium nitrate with nitric acid-washed charcoal, followed by evaporation to dryness of the impregnated charcoal.

BENJAMIN W. HOWK.
MARK W. FARLOW.

REFERENCES CITED

The following references are of record in the file of this patent:

UNITED STATES PATENTS

| Number | Name | Date |
| --- | --- | --- |
| 2,176,018 | Cope et al. | Oct. 10, 1939 |
| 2,448,755 | Zellner | Mar. 28, 1941 |
| 2,334,140 | Winans | Nov. 9, 1943 |
| 2,342,101 | Cass et al. | Feb. 22, 1944 |

OTHER REFERENCES

Adkins: "Reactions of Hydrogen" (U. of Wisc.), pp. 128–129 (1937).